United States Patent
Zaleski, Sr. et al.

(10) Patent No.: US 11,220,137 B2
(45) Date of Patent: Jan. 11, 2022

(54) SUPPLEMENTAL TIRE TREAD FOR A SOLID TIRE

(71) Applicants: Tom Zaleski, Sr., Edmonton (CA);
Tom Zaleski, Jr., Edmonton (CA)

(72) Inventors: Tom Zaleski, Sr., Edmonton (CA);
Tom Zaleski, Jr., Edmonton (CA)

( * ) Notice: Subject to any disclaimer, the term of this patent is extended or adjusted under 35 U.S.C. 154(b) by 539 days.

(21) Appl. No.: 15/862,841

(22) Filed: Jan. 5, 2018

(65) Prior Publication Data

US 2019/0210408 A1    Jul. 11, 2019

(51) Int. Cl.
| | |
|---|---|
| B60C 11/02 | (2006.01) |
| B60C 27/06 | (2006.01) |
| B60C 27/16 | (2006.01) |
| B60C 11/16 | (2006.01) |
| B60C 7/10 | (2006.01) |
| B60C 7/26 | (2006.01) |

(52) U.S. Cl.
CPC ............. B60C 11/02 (2013.01); B60C 7/10 (2013.01); B60C 7/26 (2013.01); B60C 11/1637 (2013.01); B60C 27/065 (2013.01); B60C 27/066 (2013.01); B60C 27/16 (2013.01)

(58) Field of Classification Search
CPC ....... B60C 11/02; B60C 27/06; B60C 27/061; B60C 27/062; B60C 27/065; B60C 27/16; B60C 27/066
See application file for complete search history.

(56) References Cited

U.S. PATENT DOCUMENTS

| | | | |
|---|---|---|---|
| 1,205,736 A | * | 11/1916 | Harmon .................. B60C 11/02 152/187 |
| 1,598,278 A | | 8/1926 | Hill |
| 1,775,008 A | | 9/1930 | Waters |
| 2,318,918 A | | 5/1943 | Austin |
| 2,416,862 A | | 3/1947 | Baker |
| 2,467,017 A | | 4/1949 | Eger |
| 2,898,965 A | | 8/1959 | Eddy |
| 2,992,863 A | | 7/1961 | Fredricks et al. |

(Continued)

FOREIGN PATENT DOCUMENTS

| | | | |
|---|---|---|---|
| CA | 2709562 A1 | * | 1/2012 |
| CA | 2709562 C | | 1/2012 |

(Continued)

OTHER PUBLICATIONS

Machine translation for Japan 55-098603 U (Year: 2020).*

*Primary Examiner* — Steven D Maki (74) *Attorney, Agent, or Firm* — Christensen O'Connor Johnson Kindness PLLC (57) ABSTRACT

A supplemental tire tread for installation on an outer surface of a solid tire, the outer surface of the solid tire defining opposed sidewalls and a tread surface that extend between the sidewalls. The supplemental tire tread has a tread body having an outer tread surface, an inner surface, and an attachment for attaching the tread body around the tread surface of the tire. The inner surface of the tread body has tire supports with tire receiving receptacles that open away from the inner surface of the tread body and receive the solid tires when installed. The tread body has anchor receptacles that engage anchors that pierce the solid tires to support the tread body against relative rotation of the solid tire and the tread body.

21 Claims, 4 Drawing Sheets

(56) References Cited

U.S. PATENT DOCUMENTS

| | | | |
|---|---|---|---|
| 2,998,043 A | 8/1961 | Patrick et al. | |
| 3,004,577 A * | 10/1961 | Morse | B60C 27/16 |
| | | | 152/175 |
| 3,581,797 A | 6/1971 | Kinnucan | |
| 3,696,852 A | 10/1972 | Oulman | |
| 3,935,891 A | 2/1976 | McCloud et al. | |
| D243,599 S | 3/1977 | Gilmartin | |
| 4,010,789 A | 3/1977 | Vidakovic et al. | |
| 4,155,388 A | 5/1979 | Rajcic et al. | |
| 4,271,887 A | 6/1981 | Holzwarth et al. | |
| 4,408,646 A | 10/1983 | Forsyth | |
| 4,854,357 A | 8/1989 | Mostafa Taha | |
| 5,454,413 A * | 10/1995 | Morelli | B60C 27/20 |
| | | | 152/187 |
| 6,478,387 B1 | 11/2002 | Rayman | |
| 6,637,840 B2 | 10/2003 | Zaleski et al. | |
| 7,258,405 B2 | 8/2007 | Pringiers | |
| 7,980,282 B2 | 7/2011 | Moyna et al. | |
| 2012/0305152 A1 | 12/2012 | Son | |
| 2016/0368333 A1 | 12/2016 | Zaleski, Sr. et al. | |

FOREIGN PATENT DOCUMENTS

| | | | |
|---|---|---|---|
| CN | 36204127 U | | 5/1987 |
| FR | 1389516 A | | 2/1965 |
| GB | 1229 A | * | 12/1901 |
| GB | 25767 A | * | 8/1904 |
| GB | 15401 A | * | 7/1907 |
| GB | 190904981 A | | 10/1909 |
| GB | 4110 A | * | 9/1914 |
| GB | 271977 A | | 3/1926 |
| GB | 612717 A | * | 11/1948 |
| GB | 2143482 A | | 2/1985 |
| JP | 55-098603 U | * | 7/1990 |

* cited by examiner

SUPPLEMENTAL TIRE TREAD FOR A SOLID TIRE

TECHNICAL FIELD

This relates to a supplemental tire tread installed on a solid tire, such as a tire that is made with rubber or is filled with structural foam, polymer, or the like.

BACKGROUND

Canadian patent application no. 2,709,562 (Zaleski) entitled "Removable tire tread" describes a tire tread designed to be installed on a tire with a rounded tread surface, such as are commonly used in agriculture. The removable tire tread increases the surface area engaged with a ground surface to increase traction and reduce the environmental impact caused by a tire. This is particularly useful when working in soft ground conditions, or in environmentally sensitive areas.

SUMMARY

According to an aspect, there is provided a supplemental tire tread for installation on an outer surface of a solid tire, the outer surface of the solid tire defining opposed sidewalls and a tread surface that extend between the sidewalls, the supplemental tire tread comprising a tread body having an outer tread surface, an inner surface, and an attachment for attaching the tread body around the tread surface of the tire, wherein the inner surface of the tread body comprises tire supports, the tire supports comprising tire receiving receptacles that open away from the inner surface of the tread body, and the tread body comprises anchor receptacles that engage anchors that pierce the solid tires such that, when the tread body is installed on the tire, the tire receiving receptacles receive the outer surface of the solid tire such that the tire receiving receptacles support the tread body against relative transverse movement of the solid tire and the tread body, and the anchors piercing the outer surface of the solid tire support the tread body against relative rotation of the solid tire and the tread body.

According to other aspects, the tire supports may comprise saddles having a transverse support that extend transversely across the outer surface of the tire and opposed sidewall supports that extend away from the inner surface of the tread body and engage opposite sidewalls of the solid tire, the anchor receptacles may comprise apertures in the transverse support or the sidewall supports, the apertures receiving pin anchors, the anchor receptacles may comprise apertures in the tread body that receive pin anchors, the apertures being positioned such that, when the tread body is installed on the solid tire, the apertures are adjacent to the outer surface of the solid tire and the pin anchors engage the outer surface of the solid tire, the anchor receptacles may comprise an outer support on the outer tread surface, and an inner support on the inner surface of the tread body that supports the tread body against the outer tread surface of the tire, the anchor receptacles may comprise apertures that receive pin anchors, and the pin anchors may extend at least 3 inches into the solid tire.

According to an aspect, there is provided a method of installing a supplemental tire tread on an outer surface of a solid tire, the outer surface comprising sidewalls and a tread surface that extends between the sidewalls of the solid tire, the method comprising the steps of providing a tread body having an outer tread surface, an inner surface comprising tire supports, and anchor receptacles, wherein the tire supports comprise tire receiving receptacles that open away from the inner surface of the tread body, attaching the tread body around the solid tire such that the inner surface of the tread body faces the tread surface of the solid tire, and wherein the tire receiving receptacles receive the outer surface of the solid tire such that the tire receiving receptacles support the tread body against relative transverse movement of the solid tire and the tread body, and anchors are installed in the anchor receptacles to anchor the tread body to the solid tire, the anchors piercing the outer surface of the solid tire such that the anchors support the tread body against relative rotation of the solid tire and the tread body.

According to other aspects, the tire supports may comprise saddles having a transverse support that extend transversely across the outer surface of the tire and opposed sidewall supports that extend away from the inner surface of the tread body and engage opposite sidewalls of the solid tire, the anchor receptacles may comprise apertures in the transverse support or the sidewall supports, the apertures receiving pin anchors, the anchor receptacles may comprise apertures in the tread body that receive pin anchors, the apertures being positioned such that, when the tread body is installed on the solid tire, the apertures are adjacent to the outer surface of the solid tire and the pin anchors engage the outer surface of the solid tire, the anchor receptacles may comprise an outer support on the outer tread surface, and an inner support on the inner surface of the tread body that supports the tread body against the outer tread surface of the tire, the anchor receptacles may comprise apertures that receive pin anchors, and the pin anchors may extend at least 3 inches into the solid tire.

According to an aspect, there is provided, in combination, a wheel comprising a solid tire mounted on a rim, the solid tire having an outer surface and an inner tire surface that engages the rim, the outer surface comprising an outer tread surface and sidewalls that extend between the inner tire surface and the tread surface, a supplemental tire tread installed on the wheel, the supplemental tire tread comprising a tread body having an outer tread surface, an inner surface, and an attachment for attaching the tread body around the tread surface of the tire, wherein the inner surface of the tread body comprises tire supports, the tire supports comprising tire receiving receptacles that open away from the inner surface of the tread body and receive the outer surface of the solid tire such that the tire receiving receptacles support the tread body against relative transverse movement of the solid tire and the tread body, and the tread body comprises anchor receptacles and anchors that are engaged between the anchor receptacles and the solid tire, the anchors piercing the outer surface of the solid tire such that the anchors support the tread body against relative rotation of the solid tire and the tread body.

According to other aspects, the tire supports may comprise saddles having a transverse support that extend transversely across the outer surface of the tire and opposed sidewall supports that extend away from the inner surface of the tread body and engage opposite sidewalls of the solid tire, the anchor receptacles may comprise apertures in the transverse support or the sidewall supports, the apertures receiving pin anchors, the anchor receptacles may comprise apertures that receive pin anchors, the pin anchors may extend at least 3 inches into the solid tire, the anchor receptacles may comprise apertures in the tread body that receive pin anchors, the apertures being positioned such that, when the tread body is installed on the solid tire, the apertures are adjacent to the outer surface of the solid tire and the pin anchors engage the outer surface of the solid tire, and the anchor receptacles may comprise an outer support on the outer tread surface, and an inner support on the inner surface of the tread body that supports the tread body against the outer tread surface of the tire.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A supplemental tire tread, generally identified by reference number 10, will now be described with reference to FIG. 1 through 6.

Supplemental tire tread 10 is intended for use on a wheel 100 that includes a solid tire 102 mounted on a rim 104. Solid tire 102 has an outer tire surface 106, an inner tire surface 108 that engages rim 104, and sidewalls 110 that extend between inner tire surface 108 and outer tire surface 106. Rim 104 may be any typically rim commonly used for tires, such as those made from metal, and is the structural element that attaches wheel 100 to the drivetrain of the vehicle or equipment on which it is installed (not shown), and supports the tire 102.

Figure 2:
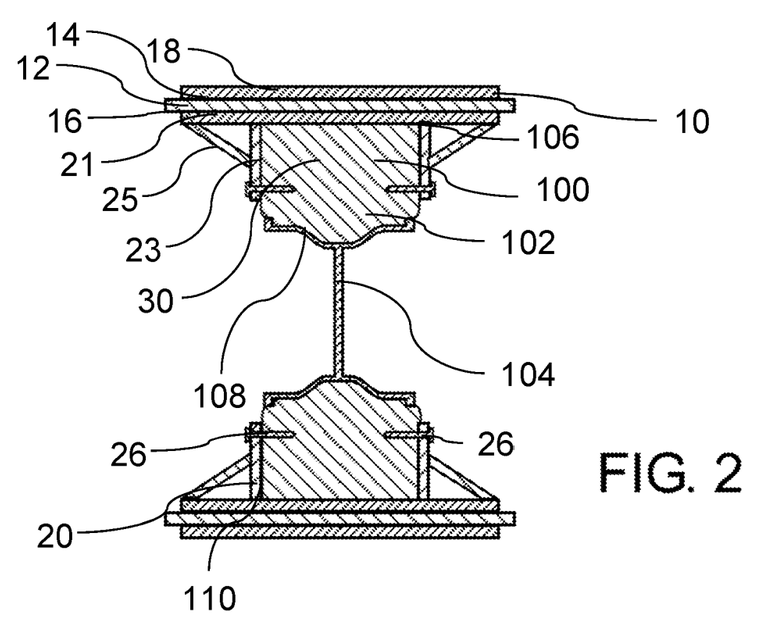
FIG. 2 is a front elevation view in section of a tire with a supplemental tire tread attached.

As can be seen for example in FIG. 2, supplemental tire tread 10 is intended for use on a solid tire, including those that may be found on various types of industrial equipment, such as trucks, telehandlers, etc. As used herein, the term "solid tire" is intended to cover any tire that structurally or mechanically supports the outer tire surface away from the rim by a material, rather than pneumatic pressure. For example, solid tire 102 may be made entirely from rubber, such as may be made in a single mold, or by layering different layers of rubber, which allows different types of rubber to be used. Solid tire 102 may also be a composite structure, such as one that includes metal bands embedded within rubber or polymeric materials, and/or multiple types of rubber or polymeric materials. Alternatively, solid tire 102 may have a cavity that is filled with a structural foam or a polymer. Solid tire 102 may be manufactured as a solid tire, or may be converted from a pneumatic tire by filling the pneumatic tire with a structural material such as a foam or other filler, such that pneumatic pressure is not relied upon to support the tire. The various types of solid tires and methods of making solid tires are known in the art, and will not be described further.

Figure 1:
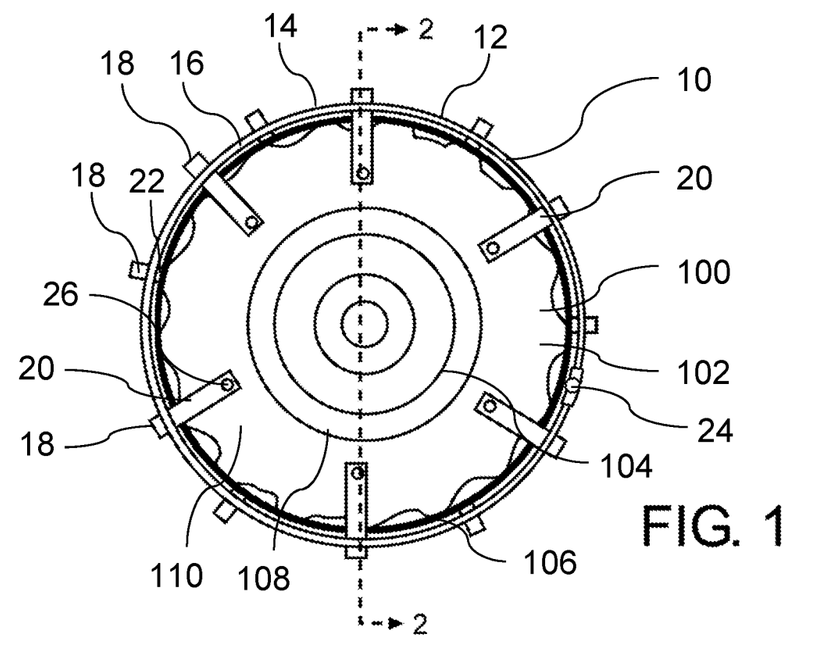
FIG. 1 is a side elevation view of a tire with a supplemental tire tread attached.

Referring to FIGS. 1 and 2, supplemental tire tread 10 is installed on wheel 100. Supplemental tire tread 10 has a tread body 12 with an outer tread surface 14, and an inner surface 16 that faces outer surface 106 of tire 102. Tread body 12 is preferably strong and flexible, and may be made from, for example, a material similar to what is used for conveyor belts. Other suitable materials will be recognized by those skilled in the art. Outer tread 14 surface preferably includes a ground-engaging profile, such as treads 18 that are mounted to tread body 12 that have a sufficient thickness to provide supplemental tire tread 10 with the desired traction in the anticipated conditions of use. The size, shape, orientation, and location of treads 18 will be based on the preferences of the user and the anticipated ground conditions. In the example depicted in FIG. 6, the treads include main treads 18a, and intermediate treads 18b that are smaller than, and spaced between, main treads 18a.

Referring to FIGS. 1 and 2, inner surface 16 is designed to engage outer surface 106 of tire 102. As shown, tire supports 20 are mounted to inner surface 16 of tread body 12 that engage tires 102. The number of tire supports 20 and their shape may vary depending on the preferences of the user. As shown in FIG. 1, additional tire engaging elements 22 are also included on inner surface 16 of tread body 12 between tire supports 20 to increase the engagement area between tire 102 and tread body 12.

Tread body 12 may be connected on the tire by any suitable connection. In the depicted example, tread body 12 is preferably designed as a single length of material that is wrapped around and connected end-to-end around the tire using a connection 24. Preferably, the connection is made to keep tread body 12 as tight as possible, however the anchors 26, which will be discussed below, are primarily responsible for preventing relative rotation of the tire and the tread body.

Figure 3:
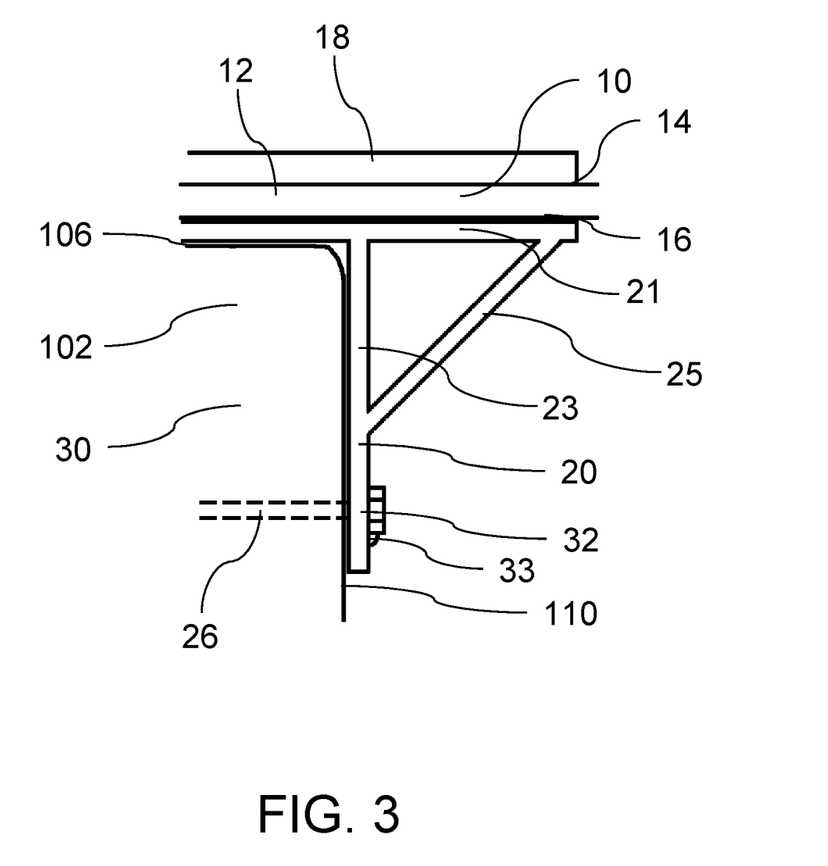
FIG. 3 is a detailed front elevation view of a portion of a tire with a supplemental tire tread attached.

In one example, referring to FIGS. 2 and 3, tire supports 20 may be described as saddles that have a transverse support 21 that extends transversely across outer surface 106 of tire 102, and opposed sidewall supports 23 that extend away from inner surface 16 of tread body 12 to define tire receiving receptacle 30 and engage opposite sidewalls 110 of solid tire 102. As depicted, transverse supports 21 extend out past the sides of tire 102 such that they are able to support a tread body 12 that is wider than the tire 102 itself. The actual width of transverse supports 21 and tread body 12 will depend on the preferences of the user and the conditions in which it is intended to be used. Side gussets 25 may also be included as shown to provide additional structural support.

In another example, referring to FIGS. 2 and 3, tire supports 20 are also provided with anchor receptacles 32. Referring to FIG. 2, tire receiving receptacles 30 receive outer surface 106 of solid tire 102 such that tire receiving receptacles 30 support tread body 12 against relative transverse movement of solid tire 102 and tread body 12. Anchor receptacles 32 as shown are apertures that receive anchors 26 that engage solid tire 102. Anchors 26 pierce tire body 102 such that anchors 26 support tread body 12 against relative rotation of wheel 100 and tread body 12. As shown, anchors 26 pierce sidewalls 110, and are pin connectors such as threaded anchors that are threaded into engagement with the solid tire, where the thread or flight grips the material of solid tire body 102.

Figure 4:
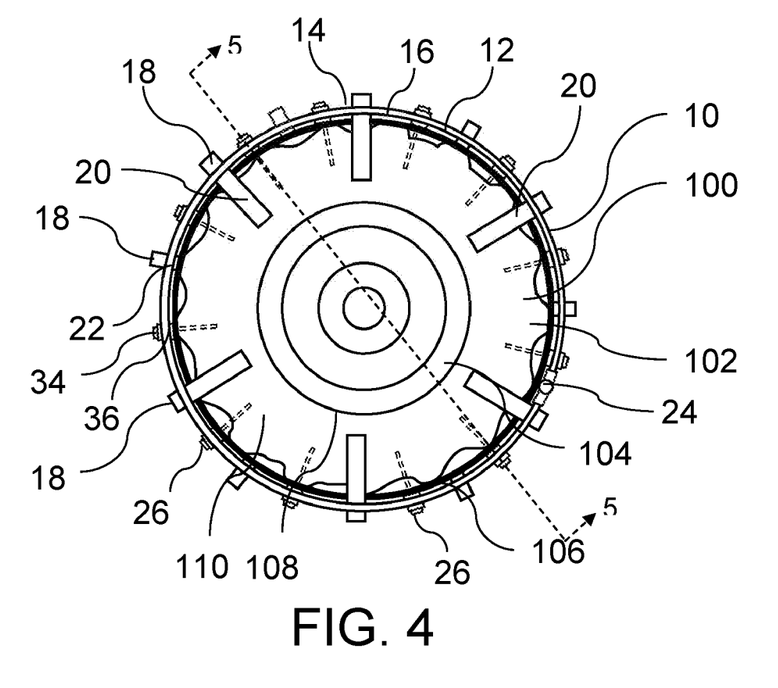
FIG. 4 is a side elevation view of a tire with an alternate supplemental tire tread attached.
Figure 5:
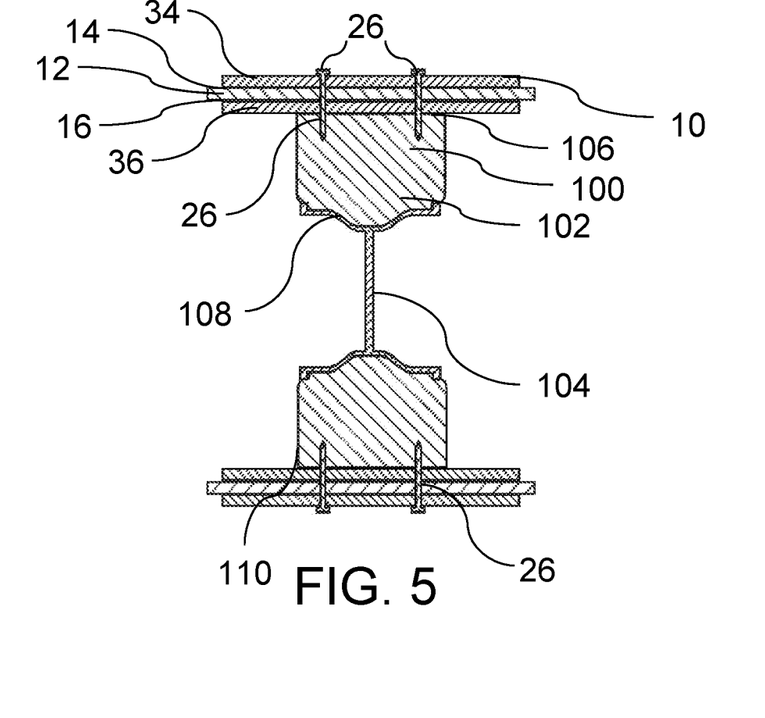
FIG. 5 is a front elevation view in section of a tire with the alternate supplemental tire tread attached.

In another example, referring to FIGS. 4 and 5, anchors 26 may also extend through outer surface 106 of tire 102. Installing anchors 26 through sidewalls 110 protects the bolt heads of anchors 26 against unnecessary wear and makes them easier to inspect, clean, and install or remove if needed.

Figure 6:
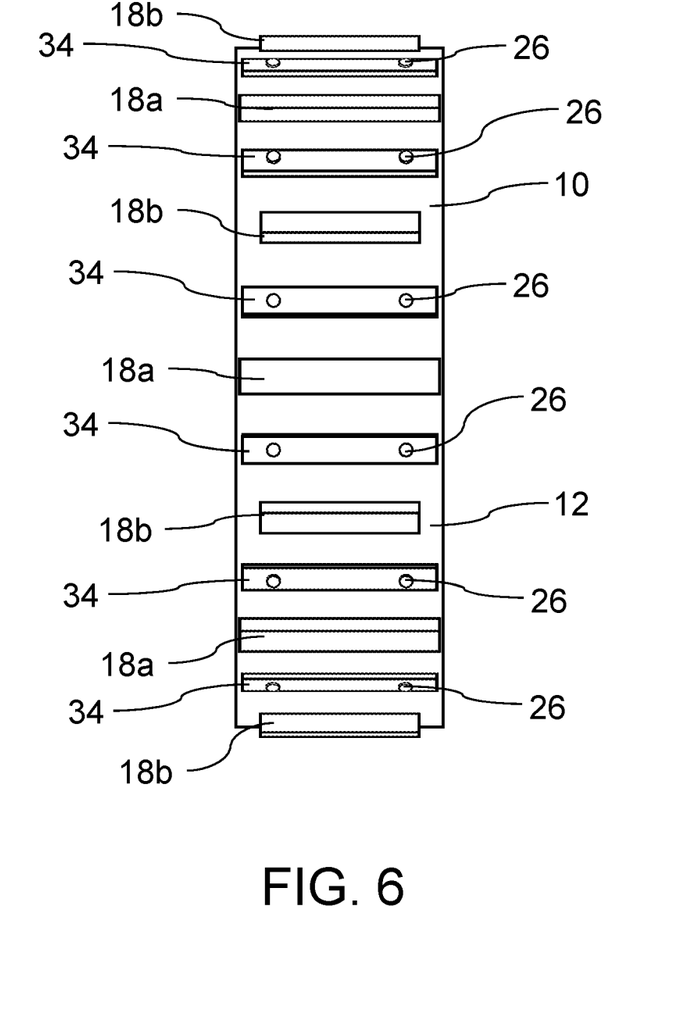
FIG. 6 is a top perspective view of a supplemental tire tread.

However, installing anchors 26 through outer surface 106 is generally easier to install and provides a more stable connection between tread body 12 and solid tire 102. Anchors 26 may be installed through anchor receptacles 32 in tire supports 20, which would then be provided in crosspiece 21, rather than side pieces 23 (not shown). Alternatively, as shown in FIGS. 4 and 5, a separate attachment that carries apertures may be provided. This attachment, in the depicted example, includes an outer support 34, such as a piece of flat bar with apertures, that is positioned against outer tread surface 14 of tread body 12, and an inner spacer element 36 between inner surface 16 of tread body 12 and outer surface 106 of solid tire 102. Anchor 26 then passes through outer support 34, tread body 12, and spacer element 36 prior to engaging solid tire 102. Suitable materials may be selected for outer support 34 and spacer element 36, such as metal for outer support 34 to provide sufficient support for anchors 26, and UHMW plastic for spacer element 36. The thickness of spacer element 36 is selected to match the thickness of tire supports 20. In this example, as shown in FIG. 6, anchors 26 are installed between treads 18a and 18b, although the spacing of anchors 26 may be selected according to the demands of a particular design.

Preferably, anchors 26 have an aggressive, or wide thread that provides suitable force. Anchors 26 may also take other forms that allow them to provide sufficient resistance to removal from tire body 102. In one example, pin connectors 26 were used that extended into tire body 102 about 3 inches. Also preferably, anchors 26 may be welded to, or adjacent to, anchor receptacles 32, or otherwise attached thereto to prevent them from unintentionally having anchors 26 being worked out of tire body 102. As shown in FIG. 3, the head of pin connectors 26 have been tack welded 33 to tire supports 20. In the example shown in FIG. 5, anchors 26 may be secured to outer support 34.

Preferably, tire supports 20 and anchors 26 are not structurally connected to rim 104 of wheel 100. While this may be an option to help strengthen the connection between tire 102 and tread body 12, it is preferable to avoid such a connection, as some equipment does not permit any modification to the rims 104 of the wheels 100. This is shown in FIGS. 1 and 2, where tire supports 20 are separate from rims 104. In some cases, tire support 20 may be welded to rim 104, but it will be understood that this is not generally the preferred approach.

The features described above may be combined together in any reasonable combination as will be recognized by those skilled in the art.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A supplemental tire tread for installation on an outer surface of a solid tire, the outer surface of the solid tire defining opposed sidewalls and a tread surface that extend between the sidewalls, the supplemental tire tread comprising:

a tread body having an outer tread surface, an inner surface, and an attachment for attaching the tread body around the tread surface of the tire, wherein:
the inner surface of the tread body comprises tire supports, the tire supports comprising tire receiving receptacles that open away from the inner surface of the tread body; and
the tread body comprises anchor receptacles that engage pin anchors that pierce the solid tire such that, when the tread body is installed on the tire, the tire receiving receptacles receive the outer surface of the solid tire such that the tire receiving receptacles support the tread body against relative transverse movement of the solid tire and the tread body, the pin anchors comprising threaded shafts that are threaded into the solid tire such that the pin anchors apply a clamping force between the tread body and the solid tire.

2. The supplemental tire tread of claim 1, wherein the tire supports comprise saddles having a transverse support that extend transversely across the outer surface of the tire and opposed sidewall supports that extend away from the inner surface of the tread body and engage opposite sidewalls of the solid tire.

3. The supplemental tire tread of claim 2, wherein the anchor receptacles comprise apertures in the transverse support or the sidewall supports, the apertures receiving pin anchors.

4. The supplemental tire tread of claim 1, wherein the anchor receptacles comprise apertures in the tread body that receive the pin anchors, the apertures being positioned such that, when the tread body is installed on the solid tire, the apertures are adjacent to the outer surface of the solid tire and the pin anchors engage the outer surface of the solid tire.

5. The supplemental tire tread of claim 4, wherein the anchor receptacles comprise an outer support on the outer tread surface, and an inner support on the inner surface of the tread body that supports the tread body against the outer tread surface of the tire.

6. The supplemental tire tread of claim 1, wherein the anchor receptacles comprise apertures that receive the pin anchors.

7. The supplemental tire tread of claim 1, wherein the pin anchors extend at least 3 inches into the solid tire.

8. A method of installing a supplemental tire tread on an outer surface of a solid tire, the outer surface comprising sidewalls and a tread surface that extends between the sidewalls of the solid tire, the method comprising the steps of:

providing a tread body having an outer tread surface, an inner surface comprising tire supports, and anchor receptacles, wherein the tire supports comprise tire receiving receptacles that open away from the inner surface of the tread body;
attaching the tread body around the solid tire such that the inner surface of the tread body faces the tread surface of the solid tire, and wherein:
the tire receiving receptacles receive the outer surface of the solid tire such that the tire receiving receptacles support the tread body against relative transverse movement of the solid tire and the tread body; and
pin anchors are installed in the anchor receptacles to anchor the tread body to the solid tire, the pin anchors comprising threaded shafts that are threaded into the solid tire such that the pin anchors apply a clamping force between the tread body and the solid tire.

9. The method of claim 8, wherein the tire supports comprise saddles having a transverse support that extend transversely across the outer surface of the tire and opposed sidewall supports that extend away from the inner surface of the tread body and engage opposite sidewalls of the solid tire.

10. The method of claim 9, wherein the anchor receptacles comprise apertures in the transverse support or the sidewall supports, the apertures receiving pin anchors.

11. The method of claim 8, wherein the anchor receptacles comprise apertures in the tread body that receive the pin anchors, the apertures being positioned such that, when the tread body is installed on the solid tire, the apertures are adjacent to the outer surface of the solid tire and the pin anchors engage the outer surface of the solid tire.

12. The method of claim 11, wherein the anchor receptacles comprise an outer support on the outer tread surface, and an inner support on the inner surface of the tread body that supports the tread body against the outer tread surface of the tire.

13. The method of claim 8, wherein the anchor receptacles comprise apertures that receive the pin anchors.

14. The method of claim 8, wherein the pin anchors extend at least 3 inches into the solid tire.

15. In combination:
a wheel comprising a solid tire mounted on a rim, the solid tire having an outer surface and an inner tire surface that engages the rim, the outer surface comprising an outer tread surface and sidewalls that extend between the inner tire surface and the tread surface; and
a supplemental tire tread installed on the wheel, the supplemental tire tread comprising:
a tread body having an outer tread surface, an inner surface, and an attachment for attaching the tread body around the tread surface of the tire, wherein:
the inner surface of the tread body comprises tire supports, the tire supports comprising tire receiving receptacles that open away from the inner surface of the tread body and receive the outer surface of the solid tire such that the tire receiving receptacles support the tread body against relative transverse movement of the solid tire and the tread body; and
the tread body comprises anchor receptacles and pin anchors that are engaged between the anchor receptacles and the solid tire, the pin anchors comprising threaded shafts that are threaded into the solid tire such that the pin anchors apply a clamping force to the tread body against solid tire.

16. The combination of claim 15, wherein the tire supports comprise saddles having a transverse support that extend transversely across the outer surface of the tire and opposed sidewall supports that extend away from the inner surface of the tread body and engage opposite sidewalls of the solid tire.

17. The combination of claim 15, wherein the anchor receptacles comprise apertures in the transverse support or the sidewall supports, the apertures receiving pin anchors.

18. The combination of claim 15, wherein the anchor receptacles comprise apertures that receive the pin anchors.

19. The combination of claim 15, wherein the pin anchors extend at least 3 inches into the solid tire.

20. The combination of claim 15, wherein the anchor receptacles comprise apertures in the tread body that receive the pin anchors, the apertures being positioned such that, when the tread body is installed on the solid tire, the apertures are adjacent to the outer surface of the solid tire and the pin anchors engage the outer surface of the solid tire.

21. The combination of claim 15, wherein the anchor receptacles comprise an outer support on the outer tread surface, and an inner support on the inner surface of the tread body that supports the tread body against the outer tread surface of the tire.

\* \* \* \* \*

UNITED STATES PATENT AND TRADEMARK OFFICE
CERTIFICATE OF CORRECTION

| | |
|---|---|
| PATENT NO. | : 11,220,137 B2 |
| APPLICATION NO. | : 15/862841 |
| DATED | : January 11, 2022 |
| INVENTOR(S) | : T. Zaleski, Sr. et al. |

It is certified that error appears in the above-identified patent and that said Letters Patent is hereby corrected as shown below:

In the Claims

| Column | Line | |
|---|---|---|
| 8 | 13 | Claim 15, change "against solid" to -- against the solid --. |

Signed and Sealed this
Seventeenth Day of January, 2023

*Katherine Kelly Vidal*

Katherine Kelly Vidal
*Director of the United States Patent and Trademark Office*